US010235385B2

(12) United States Patent
Liu

(10) Patent No.: US 10,235,385 B2
(45) Date of Patent: Mar. 19, 2019

(54) INDUSTRIAL MONITORING SYSTEM

(71) Applicant: Siemens Aktiengesellschaft, München (DE)

(72) Inventor: Quan Bin Liu, Beijing (CN)

(73) Assignee: Siemens Aktiengesellschaft, München (DE)

(*) Notice: Subject to any disclaimer, the term of this patent is extended or adjusted under 35 U.S.C. 154(b) by 616 days.

(21) Appl. No.: 14/784,618

(22) PCT Filed: Apr. 25, 2013

(86) PCT No.: PCT/CN2013/074722
§ 371 (c)(1),
(2) Date: Oct. 15, 2015

(87) PCT Pub. No.: WO2014/172877
PCT Pub. Date: Oct. 30, 2014

(65) Prior Publication Data
US 2016/0078053 A1 Mar. 17, 2016

(51) Int. Cl.
*G06F 17/30* (2006.01)
*G05B 19/418* (2006.01)

(52) U.S. Cl.
CPC ... *G06F 17/30194* (2013.01); *G05B 19/4184* (2013.01); *G06F 17/30539* (2013.01);
(Continued)

(58) Field of Classification Search
CPC ......... G06F 17/30194; G06F 17/30539; G06F 17/30545; G06F 17/30557;
(Continued)

(56) References Cited

U.S. PATENT DOCUMENTS

2008/0126408 A1 5/2008 Middleton
2010/0050097 A1* 2/2010 McGreevy .......... G05B 19/409
715/762
(Continued)

FOREIGN PATENT DOCUMENTS

CN 1593726 A 3/2005
CN 101788800 A 7/2010
(Continued)

OTHER PUBLICATIONS

Chinese Office Action dated Oct. 9, 2016.
(Continued)

*Primary Examiner* — Kris E Mackes
*Assistant Examiner* — Tiffany Thuy Bui
(74) *Attorney, Agent, or Firm* — Harness, Dickey & Pierce, P.L.C.

(57) ABSTRACT

An industrial monitoring system is disclosed. In an embodiment it includes a device layer, a device driving layer, a data sharing layer, a data routing layer, a data scheduling layer, a service layer, and a presentation layer. The data sharing layer, the data routing layer, and the data scheduling layer are organized by using a non-relational database, or organized in a hybrid way by using the non-relational database and a relational database. The industrial monitoring system disclosed can implement processing such as real-time storage and sharing of a large amount of data, and data mining and retrieval.

5 Claims, 1 Drawing Sheet

(52) U.S. Cl.
CPC .. *G06F 17/30545* (2013.01); *G06F 17/30557* (2013.01); *G05B 2219/31323* (2013.01); *G05B 2219/31329* (2013.01); *G05B 2219/31395* (2013.01); *G05B 2219/31406* (2013.01); *G05B 2219/31457* (2013.01); *G05B 2219/37533* (2013.01); *Y02P 90/14* (2015.11); *Y02P 90/20* (2015.11); *Y02P 90/24* (2015.11)

(58) Field of Classification Search
CPC ...... G05B 19/4184; G05B 2219/31323; G05B 2219/31329; G05B 2219/31395; G05B 2219/31406; G05B 2219/31457; G05B 2219/37533
See application file for complete search history.

(56) References Cited

U.S. PATENT DOCUMENTS

| | | | | |
|---|---|---|---|---|
| 2012/0016607 | A1* | 1/2012 | Cottrell | G05B 23/0229 702/62 |
| 2013/0051238 | A1* | 2/2013 | Maria | H04W 24/10 370/241 |
| 2013/0131840 | A1* | 5/2013 | Govindaraj | G05B 19/41865 700/19 |
| 2013/0211546 | A1* | 8/2013 | Lawson | G05B 19/4185 700/9 |
| 2013/0212214 | A1* | 8/2013 | Lawson | G06Q 10/06315 709/217 |
| 2013/0268560 | A1* | 10/2013 | Pallares Lopez | G06F 9/5083 707/770 |
| 2014/0047064 | A1* | 2/2014 | Maturana | H04L 67/125 709/217 |
| 2014/0047107 | A1* | 2/2014 | Maturana | H04L 43/04 709/224 |
| 2014/0129688 | A1* | 5/2014 | Asenjo | H04L 43/04 709/221 |
| 2017/0214575 | A1* | 7/2017 | Asenjo | H04L 41/0813 |
| 2017/0223110 | A1* | 8/2017 | Lawson | H04L 67/1097 |

FOREIGN PATENT DOCUMENTS

| | | |
|---|---|---|
| CN | 201716561 U | 1/2011 |
| CN | 102109838 A | 6/2011 |
| CN | 102880475 A | 1/2013 |
| CN | 202837961 U | 3/2013 |

OTHER PUBLICATIONS

Extended European Search Report dated Nov. 29, 2016.
International Search Report PCT/ISA/210 for International Application No. PCT/CN2013/074722 dated Jan. 8, 2014.
Written Opinion of the International Searching Authority PCT/ISA/237 for International Application No. PCT/CN2013/074722 dated Jan. 8, 2014.

* cited by examiner

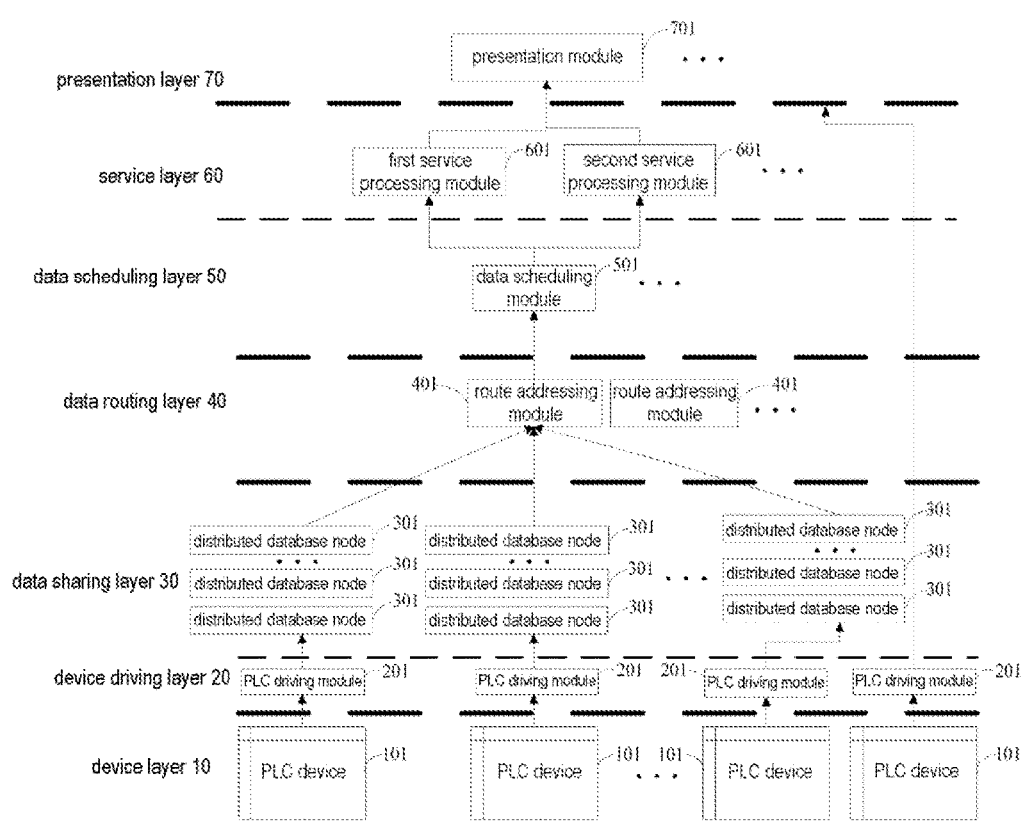

INDUSTRIAL MONITORING SYSTEM

PRIORITY STATEMENT

This application is the national phase under 35 U.S.C. § 371 of PCT International Application No. PCT/CN2013/074722 which has an International filing date of Apr. 25, 2013 and which designated the United States of America, the entire contents of which are hereby incorporated herein by reference.

FIELD

The present invention generally relates to the field of industry, in particular an industrial monitoring system.

BACKGROUND ART

In existing industrial monitoring systems, relevant data is generally stored in a conventional relational database, e.g. MSSQL, Oracle or Mysql. These relational databases are good at processing the storage and accessing of data having complex logical relationships. These data having complex logical relationships are stored in a table in a manner of logical combination, based on the principal of minimum redundancy; when data is accessed and complex data analysis is performed, it may be necessary to subject multiple tables to relational query.

However, as industrial monitoring systems increase in scale and complexity while applications become more demand-based at a deep level, large amounts of sample data need to be added to databases, to be extracted by upper-level applications and used for data mining, scientific calculations, and the generation of reports and images, etc. It is very time-consuming to store such colossal data amounts one item at a time in different relational database report forms, and it is not easy to extract these data from the different relational database report forms.

On this basis, following industrial networking and real-time requirements, certain real-time database systems for industrial production have emerged, such as industrial SQL from the company Wonderware, PL from the company OSIsoft, and InfoPlus.2.1. from the company ASPEN, etc. However, these real-time database systems are too expensive for some small-to-medium sized enterprises.

SUMMARY

The inventors have discovered that there is currently a need to develop a novel industrial monitoring system.

In view of the above, at least one embodiment of the present invention proposes an industrial monitoring system, for making an industrial monitoring system perform real-time data addition and highly efficient data query and processing.

The industrial monitoring system proposed by at least one embodiment of the present invention comprises: a device layer, a device driving layer, a data sharing layer, a data routing layer, a data scheduling layer, a service layer and a presentation layer; wherein
the device layer comprises at least two industrial devices;
the device driving layer comprises a driving module corresponding to each industrial device, each driving module being used for controlling the industrial device corresponding thereto, and collecting data of the industrial device;
the data sharing layer comprises at least two distributed database nodes, each distributed database node being used for receiving data collected by at least one driving module;
the data routing layer comprises at least one route addressing module, each route addressing module being used for, according to an instruction of the data scheduling layer, route-addressing corresponding data from the data sharing layer, and transmitting the addressed data to the scheduling layer;
the data scheduling layer comprises at least one data scheduling module, for, according to a data extraction request of the service layer, instructing a corresponding route addressing module to extract corresponding data, and transmitting the extracted data to the service layer;
the service layer comprises at least two service processing modules, each service processing module being used for, according to its own service processing requirement, sending a data extraction request to a data scheduling module of the data scheduling layer, and performing corresponding service processing according to data uploaded by the scheduling layer, and providing a processing result, according to a presentation requirement of a corresponding presentation module of the presentation layer, to the corresponding presentation module; and
the presentation layer comprises at least two presentation modules, each presentation module being used for, according to a user requirement, presenting a processing result of a corresponding service processing module of the service layer, wherein the data sharing layer, data routing layer and data scheduling layer are organized using a non-relational database, or organized in a mixed fashion using a non-relational database and a relational database.

In another embodiment of the present invention, the driving module is located in a controller of the industrial device corresponding thereto;
the distributed database node is located in a local server device;
the route addressing module and data scheduling module are located in a regional server device;
the service processing module is located in a regional server device or a centralized server device; and
the presentation module is located in a client device.

BRIEF DESCRIPTION OF THE DRAWINGS

A preferred embodiment of the present invention will be described in detail below with reference to the accompanying drawings, to give those skilled in the art a clearer understanding of the abovementioned and other features and advantages of the present invention. In the Drawings:

FIG. 1 is an example structural diagram of an industrial monitoring system in an embodiment of the present invention.

DETAILED DESCRIPTION OF THE EXAMPLE EMBODIMENT

The industrial monitoring system proposed by at least one embodiment of the present invention comprises: a device layer, a device driving layer, a data sharing layer, a data routing layer, a data scheduling layer, a service layer and a presentation layer; wherein
the device layer comprises at least two industrial devices;
the device driving layer comprises a driving module corresponding to each industrial device, each driving module being used for controlling the industrial device corresponding thereto, and collecting data of the industrial device;

the data sharing layer comprises at least two distributed database nodes, each distributed database node being used for receiving data collected by at least one driving module;

the data routing layer comprises at least one route addressing module, each route addressing module being used for, according to an instruction of the data scheduling layer, route-addressing corresponding data from the data sharing layer, and transmitting the addressed data to the scheduling layer;

the data scheduling layer comprises at least one data scheduling module, for, according to a data extraction request of the service layer, instructing a corresponding route addressing module to extract corresponding data, and transmitting the extracted data to the service layer;

the service layer comprises at least two service processing modules, each service processing module being used for, according to its own service processing requirement, sending a data extraction request to a data scheduling module of the data scheduling layer, and performing corresponding service processing according to data uploaded by the scheduling layer, and providing a processing result, according to a presentation requirement of a corresponding presentation module of the presentation layer, to the corresponding presentation module; and the presentation layer comprises at least two presentation modules, each presentation module being used for, according to a user requirement, presenting a processing result of a corresponding service processing module of the service layer, wherein the data sharing layer, data routing layer and data scheduling layer are organized using a non-relational database, or organized in a mixed fashion using a non-relational database and a relational database.

In another embodiment of the present invention, the service layer is realized using a domain-driven design and a service-oriented architecture model.

In another embodiment of the present invention, processing in at least one layer of the data routing layer, data scheduling layer and service layer uses cloud processing.

In another embodiment of the present invention, the driving module is located in a controller of the industrial device corresponding thereto;

the distributed database node is located in a local server device;

the route addressing module and data scheduling module are located in a regional server device;

the service processing module is located in a regional server device or a centralized server device; and the presentation module is located in a client device.

It can be seen from the above solution that since an industrial monitoring system comprising a device layer, a device driving layer, a data sharing layer, a data routing layer, a data scheduling layer, a service layer and a presentation layer is disposed in the embodiments of the present invention, and since the data sharing layer, data routing layer and data scheduling layer are organized using a non-relational database, or organized in a mixed fashion using a non-relational database and a relational database, the industrial monitoring system can realize processing such as real-time storage, sharing, data mining and searching of large data amounts, to improve the efficiency of data query.

Furthermore, the use of a domain-driven design and a service-oriented architecture model to realize the service layer enables the industrial monitoring system of the present application to decouple the dependency of a service module on a data layer, so that a significant mutual effect will not occur when the service model is updated or the data layer structure is changed.

In the present invention, in order to develop a novel industrial monitoring system architecture, to enable the industrial monitoring system to perform real-time data addition and highly efficient data query and processing, consideration is given to the provision of an industrial monitoring system comprising a device layer, a device driving layer, a data sharing layer, a data routing layer, a data scheduling layer, a service layer and a presentation layer. In the industrial monitoring system, the data sharing layer, data routing layer and data scheduling layer are organized using a non-relational database, or organized in a mixed fashion using a non-relational database and a relational database, so that the industrial monitoring system can realize processing such as real-time storage, sharing, data mining and searching of large data amounts.

To clarify the object, technical solution and advantages of the present invention, the present invention is explained in further detail below by way of an embodiment.

FIG. 1 is an example structural diagram of an industrial monitoring system in an embodiment of the present invention. As FIG. 1 shows, the system comprises: a device layer 10, a device driving layer 20, a data sharing layer 30, a data routing layer 40, a data scheduling layer 50, a service layer 60 and a presentation layer 70.

The device layer 10 comprises at least two industrial devices 101. FIG. 1 shows multiple PLC devices; in actual applications, other devices such as OPC servers, digital video cameras (DV), cameras or audio capture devices may also be included as required.

The device driving layer 20 comprises a driving module 201 corresponding to each industrial device 101, each driving module 201 being used for controlling the industrial device 101 corresponding thereto, and collecting data of the industrial device 101. For example, corresponding to each PLC device in FIG. 1, a corresponding PLC driving module may be selected for a COM interface or other type of interface. Corresponding to another industrial device, a driving module suitable for the industrial device in question and a corresponding interface may be correspondingly selected; these cases are not listed here one by one.

The data sharing layer 30 comprises at least two distributed database nodes 301, each distributed database node 301 being used for receiving data collected by at least one driving module 201. During particular implementation, different distributed database nodes 301 may be disposed at different physical locations; one or more than one distributed database node 301 may also be disposed at the same physical location.

The data routing layer 40 comprises at least one route addressing module 401; each route addressing module 401 may be used for, according to an instruction of the data scheduling layer 50, route-addressing corresponding data from the data sharing layer 30, and transmitting the addressed data to the scheduling layer 50. During particular implementation, at least one route addressing module 401 may be disposed for different physical locations respectively.

The data scheduling layer 50 comprises at least one data scheduling module 501; each data scheduling module 501 may be used for, according to a data extraction request from each service processing module 601 of the service layer 60, instructing a corresponding route addressing module 40 to extract corresponding data, and transmitting the extracted data to a corresponding service processing module 601 of the service layer 60. During particular implementation, at least one data scheduling module 501 may be disposed for different physical locations respectively, e.g. one data scheduling module 501 may be disposed for a Beijing subregion, or it is also possible to dispose more than one data scheduling The service layer 60 comprises at least two service processing modules 601, such as a service logic processing module, data analysis service module, etc., each service processing module 601 being used for, according to its own service processing requirement, sending a data extraction request to a corresponding data scheduling module 501 of the data scheduling layer 50, and performing corresponding service processing according to data uploaded by the scheduling layer 50, and providing a processing result, according to a presentation requirement of a corresponding presentation module 701 of the presentation layer 70, to the corresponding presentation module 701.

The presentation layer 70 comprises at least two presentation modules 701, each presentation module 701 being used for, according to a user requirement, presenting a processing result of a corresponding service processing module 601 of the service layer 60.

In this embodiment, the data sharing layer 30, data routing layer 40 and data scheduling layer 50 are organized using a non-relational database, or organized in a mixed fashion using a non-relational database and a relational database. For example, the non-relational database may be realized using a basic architecture of a Hadoop distributed file system (HDFS).

In addition, the service layer 60 in this embodiment may be realized using a Domain-Driven Design (DDD) and a Service-Oriented Architecture (SOA) model. Thus, the dependency of a service model on a data layer can be decoupled, so that a significant mutual effect will not occur when the service model is updated or the data layer structure is changed.

In this embodiment, processing in at least one layer or all layers from the data routing layer 40 to the service layer may use cloud processing, e.g. a server of the data scheduling layer 40 may use an IaaS scheme, and the service layer 60 may establish PaaS and even provide a service directly to an end user by establishing SaaS.

In this embodiment, during particular implementation, the driving module 201 may be deployed in a controller of the industrial device 101 corresponding thereto. The distributed database node 301 may be deployed in a local server device. The route addressing module 401 and data scheduling module 501 may be deployed in a regional server device. The service processing module 601 may be deployed in a regional server device or a centralized server device. The presentation module 701 may be deployed in a client device.

The above embodiment is merely a preferred embodiment of the present invention, and not intended to limit the present invention. All amendments, equivalent substitutions or improvements etc. made within the spirit and principles of the present invention should be included in the scope of protection thereof.

The invention claimed is:

1. An industrial monitoring system, comprising:
a device layer including at least two industrial devices;
a device driving layer including a plurality of driving modules, each of the plurality of driving modules being executed by a controller, and configured to control a corresponding industrial device of the at least two industrial devices, and collect data from the corresponding industrial device;
a data sharing layer including at least two distributed database nodes, each of the at least two distributed database nodes including a respective local server configured to receive data collected by at least one of the plurality of driving modules;
a data routing layer including at least one route addressing module, each of the at least one route addressing module being executed by a first regional server, and configured to route-address data from at least one of the at least two distributed database nodes according to an instruction of a data scheduling layer, and send the route-addressed data to the data scheduling layer;
the data scheduling layer including at least one data scheduling module, each of the at least one data scheduling module being executed by a second regional server, and configured to
instruct a corresponding route addressing module among the at least one route addressing module to extract the route-addressed data according to a data extraction request of a service layer, and send the extracted data to the service layer; and
the service layer including at least two service processing modules, each of the at least two service processing modules being executed by a centralized server,
and configured to
send the data extraction request to a data scheduling module of the at least one data scheduling module according to a service processing requirement of the service processing module,
perform corresponding service processing according to the extracted data sent by the data scheduling layer, and
provide a processing result of the corresponding service processing to a corresponding presentation module of a presentation layer according to a presentation requirement of the corresponding presentation module, wherein the data sharing layer, the data routing layer and the data scheduling layer are organized using a non-relational database, or are organized in a mixed fashion using a non-relational database and a relational database.

2. The system of claim 1, wherein the service layer is realized using a domain-driven design and a service-oriented architecture model.

3. The system of claim 2, wherein processing in at least one layer of the data routing layer, the data scheduling layer or the service layer includes cloud processing.

4. The system of claim 1, further comprising:
the presentation layer including at least two presentation modules, each of the at least two presentation modules being executed by a client device, and configured to present the processing result of a corresponding service processing module of the at least two service processing modules.

5. The system of claim 1, wherein the first regional server and the second regional server are the same server.

* * * * *